(12) United States Patent
Dynes

(10) Patent No.: US 11,181,063 B2
(45) Date of Patent: Nov. 23, 2021

(54) PREDICTIVE ROAD SPEED GOVERNOR

(71) Applicant: Cummins Inc., Columbus, IN (US)

(72) Inventor: Joseph R. Dynes, Columbus, IN (US)

(73) Assignee: Cummins Inc., Columbus, IN (US)

(*) Notice: Subject to any disclaimer, the term of this patent is extended or adjusted under 35 U.S.C. 154(b) by 30 days.

(21) Appl. No.: 16/729,872

(22) Filed: Dec. 30, 2019

(65) Prior Publication Data

US 2021/0199064 A1 Jul. 1, 2021

(51) Int. Cl.
*F02D 41/10* (2006.01)
*B60K 31/00* (2006.01)

(52) U.S. Cl.
CPC ........ *F02D 41/107* (2013.01); *B60K 31/0008* (2013.01); *F02D 2200/0404* (2013.01); *F02D 2200/101* (2013.01)

(58) Field of Classification Search
CPC ........... F02D 41/107; F02D 2200/0404; F02D 2200/101; B60K 31/0008
See application file for complete search history.

(56) References Cited

U.S. PATENT DOCUMENTS

| | | | |
|---|---|---|---|
| 5,868,214 A * | 2/1999 | Workman | B60K 31/047 180/179 |
| 6,134,499 A | 10/2000 | Goode et al. | |
| 6,944,532 B2 * | 9/2005 | Bellinger | B60W 10/101 701/115 |
| 6,990,401 B2 | 1/2006 | Neiss et al. | |
| 8,744,718 B2 | 6/2014 | Johansson et al. | |
| 8,972,138 B2 | 3/2015 | Johansson et al. | |
| 9,043,060 B2 * | 5/2015 | Sujan | B60W 10/06 701/22 |
| 9,043,061 B2 * | 5/2015 | Sujan | B60W 30/1882 701/22 |
| 9,108,639 B2 | 8/2015 | Johansson et al. | |
| 9,180,883 B2 | 11/2015 | Johansson et al. | |
| 9,193,264 B2 | 11/2015 | Johansson et al. | |
| 9,248,836 B2 | 2/2016 | Johansson et al. | |
| 9,352,750 B2 | 5/2016 | Johansson et al. | |
| 9,376,109 B2 | 6/2016 | Johansson et al. | |
| 9,393,963 B2 | 7/2016 | Slaton et al. | |
| 9,399,465 B2 | 7/2016 | Slaton et al. | |
| 9,511,668 B2 | 12/2016 | Johansson et al. | |
| 9,849,880 B2 | 12/2017 | D'Amato et al. | |

(Continued)

FOREIGN PATENT DOCUMENTS

WO 2019023169 1/2019

*Primary Examiner* — Phutthiwat Wongwian
*Assistant Examiner* — Susan E Scharpf
(74) *Attorney, Agent, or Firm* — Faegre Drinker Biddle & Reath LLP

(57) ABSTRACT

Engine control modules as well as methods and systems implementable in a vehicle are disclosed, in which the engine control module includes a processing unit operative to control a target vehicle speed. The processing unit receives current status information and lookahead information regarding a route to be taken by the vehicle, performs a lookahead power requirement calculation based on the current status information and the lookahead information to determine an event, calculates a plurality of offsets with respect to an isochronous speed of the vehicle based on the determined event, and sets a target vehicle speed curve by applying the plurality of offsets to the isochroous speed.

23 Claims, 7 Drawing Sheets

(56) References Cited

U.S. PATENT DOCUMENTS

| | | | |
|---|---|---|---|
| 9,988,049 B2 | 6/2018 | Slaton et al. | |
| 10,023,188 B2* | 7/2018 | Follen | B60W 30/143 |
| 2003/0216847 A1* | 11/2003 | Bellinger | B60W 30/1819 |
| | | | 701/51 |
| 2012/0232731 A1* | 9/2012 | Sujan | B60W 10/08 |
| | | | 701/22 |
| 2012/0290189 A1* | 11/2012 | Davis | F02D 15/00 |
| | | | 701/102 |
| 2013/0211695 A1* | 8/2013 | Bjernetun | B60W 50/0097 |
| | | | 701/110 |
| 2015/0345621 A1* | 12/2015 | Sujan | F16H 61/0213 |
| | | | 701/58 |
| 2017/0159581 A1* | 6/2017 | McCarthy, Jr. | F02D 23/02 |
| 2018/0230914 A1* | 8/2018 | McCarthy, Jr. | F01L 1/2422 |
| 2018/0237017 A1* | 8/2018 | Leon | B60W 10/02 |
| 2018/0265090 A1* | 9/2018 | Sharma | B60W 10/02 |
| 2019/0338849 A1* | 11/2019 | Chunodkar | B60W 30/143 |

* cited by examiner

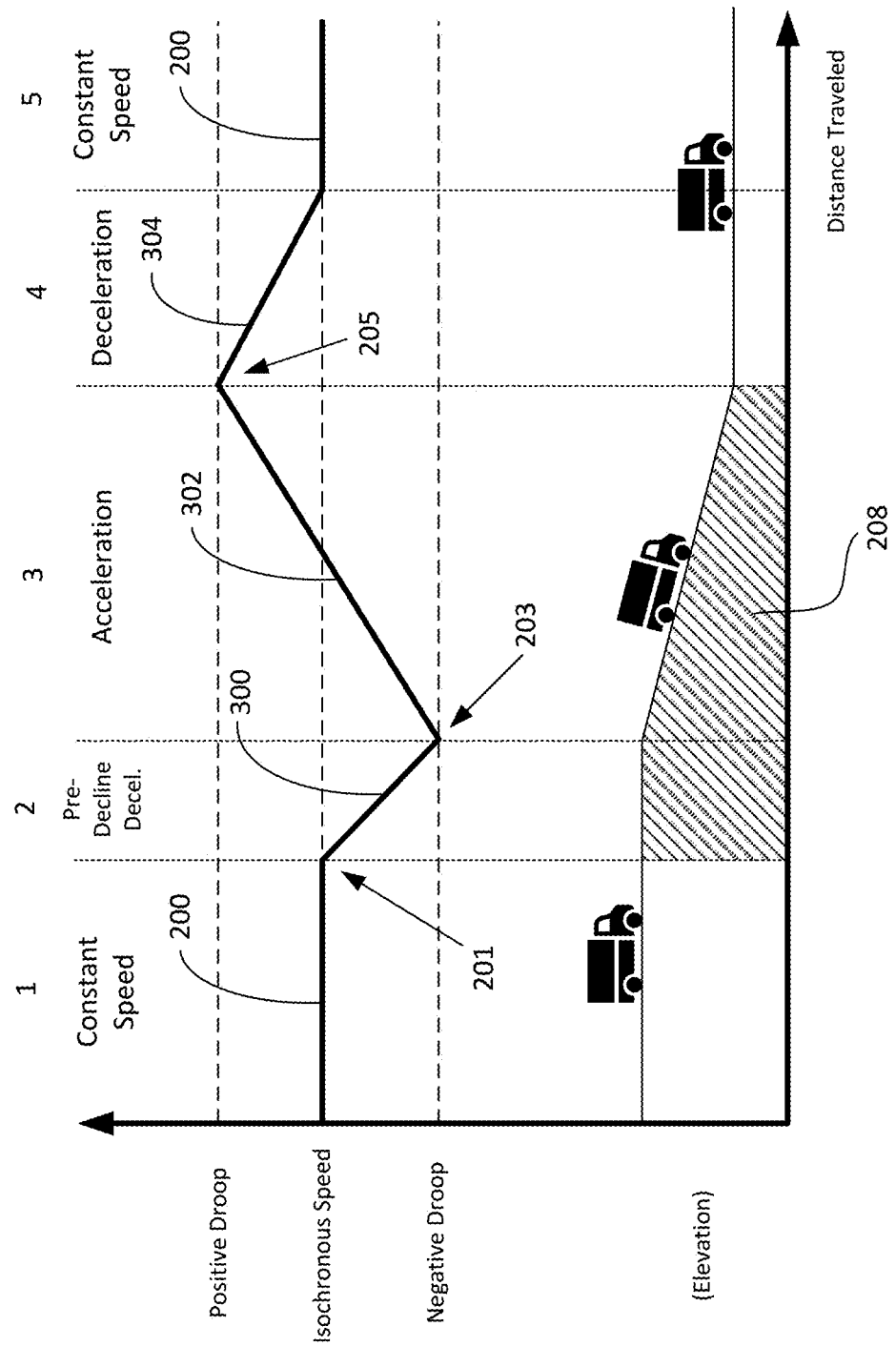

PREDICTIVE ROAD SPEED GOVERNOR

FIELD OF THE DISCLOSURE

The present application relates generally to management of coasting operation of a vehicle for fuel economy improvements, and more particularly to coasting management of a vehicle that includes a road speed governor.

BACKGROUND OF THE DISCLOSURE

Engine speed control systems, commonly known as engine speed governors or road speed governors ("RSG"), are well known in the automotive industry. In preexisting RSGs, the vehicle speed is limited to a predetermined range around an isochronous speed that the vehicle returns to after a load has been applied to or relieved from the engine. Specifically, as shown in FIG. 1A, the isochronous speed is the reference speed that the RSG strives to maintain during the operation of a vehicle 100, because the isochronous speed is the predetermined speed at which the vehicle 100 experiences increased fuel efficiency. As such, when the vehicle 100 is traveling at the isochronous speed, the engine is prevented from accelerating beyond the isochronous speed by maintaining a constant throttle position, e.g. at 100% open-throttle. However, when there is an incline in the road, the vehicle speed decreases due to the lack of acceleration, and the vehicle 100 decreases in speed during the incline, or uphill climb.

The RSG has a set of thresholds called "droops" beyond which the engine speed is not allowed to surpass to maintain fuel efficiency. That is, the maximum speed achieved by the engine while the RSG is enabled is defined by a "positive droop" value, and the minimum speed is defined by a "negative droop" value. In the example shown in FIG. 1A, the vehicle 100 travels at a constant isochronous speed (102) in zone "1" where there is no incline. During the incline, zone "2", the vehicle speed decreases (104) until it reaches the negative droop speed. Upon reaching the negative droop speed, the RSG prevents the vehicle speed from decreasing below the negative droop speed, thus maintaining the vehicle speed at the negative droop speed (106) until the end of the incline. Afterwards, in zone "3" the vehicle 100 is allowed to accelerate (108) until the vehicle speed reaches the isochronous speed. In zone "4", the vehicle 100 resumes traveling at the constant, isochronous speed (102) as it did before in zone "1".

In view of the torque usage plot of FIG. 1B, the zones "1" and "4" are shown to share the same vehicle speed and net brake torque. During the zone "2", the net brake torque increases without increasing the speed to beyond the isochronous speed, until the torque usage reaches a point where the maximal torque is required to maintain the vehicle 100 at the negative droop speed. The torque usage subsequently decreases in zone "3" such that the vehicle 100 is allowed to accelerate to reach the isochronous speed but not too much to cause the vehicle speed to surpass it, after which the torque usage is kept at a minimal level to keep a constant speed in zone "4".

In view of the above, although the RSG's prevention of vehicle acceleration may result in performance efficiency in terms of fuel economy benefits, such style of vehicle speed control is reactive based on the current road grade and does not utilize the highest brake thermal efficiency ("BTE") area 110 most efficiently, as shown in FIG. 1B. Specifically, between zone "2" and zone "3", a large portion of the torque usage occurs at areas of relatively low BTE when compared with the highest BTE area 110, signifying heat loss that could have otherwise been used more efficiently had the vehicle been allowed to increase speed prior to reaching the incline. In fact, at the end of the deceleration in zone "2" (at point 107), the engine of the vehicle 100 utilizes a BTE area that is even lower than the starting BTE area during zone "1". Therefore, there are still opportunities to increase the efficiency benefits of the RSG by controlling the vehicle speed and torque usage to use more of the high BTE area.

SUMMARY

Various embodiments of the present disclosure relate to an engine control module implementable in a vehicle, the engine control module including a processing unit operative to control a target vehicle speed. The processing unit receives current status information and lookahead information regarding a route to be taken by the vehicle, performs a lookahead power requirement calculation based on the current status information and the lookahead information to determine an event, calculates a plurality of offsets with respect to an isochronous speed of the vehicle based on the determined event, and sets a target vehicle speed curve by applying the plurality of offsets to the isochroous speed.

In one embodiment, the processing unit further determines a calibrated static value based on the lookahead power requirement calculation. The plurality of offsets are calculated based on the calibrated static value. In one embodiment, the processing unit further calculates a target speed difference ($\Delta V$) between a first speed of the vehicle at a start of the event and a second speed of the vehicle at an end of the event. The plurality of offsets are calculated based on the target speed difference.

In one example, the event is an incline along the route. In one embodiment, the target vehicle speed curve includes a pre-incline acceleration for a predetermined distance prior to a start of the event to increase the target vehicle speed above the isochronous speed. In one embodiment, the target vehicle speed curve includes a deceleration during the event to decrease the vehicle speed below the isochronous speed and a post-incline acceleration after an end of the event to increase the target vehicle speed toward the isochronous speed.

In another example, the event is a decline along the route. In one embodiment, the target vehicle speed curve includes a pre-decline deceleration for a predetermined distance prior to a start of the event to decrease the target vehicle speed below the isochronous speed. In one embodiment, the target vehicle speed curve includes an acceleration during the event to increase the target vehicle speed above the isochronous speed and a post-decline deceleration after an end of the event to decrease the target vehicle speed toward the isochronous speed.

In one embodiment, the current status information includes current road grade information. In one embodiment, the lookahead information includes upcoming road grade information. In one embodiment, the vehicle speed is to remain at or below the target vehicle speed curve at any point during the route.

Various embodiments of the present disclosure relate to methods of controlling a target vehicle speed of a vehicle, the vehicle comprising an engine control module including a processing unit. The method includes: receiving, by the processing unit, current status information and lookahead information regarding a route to be taken by the vehicle; performing, by the processing unit, a lookahead power requirement calculation based on the current status information and the lookahead information to determine an event; calculating, by the processing unit, a plurality of offsets with respect to an isochronous speed of the vehicle based on the determined event; and setting, by the processing unit, a target vehicle speed curve by applying the plurality of offsets to the isochroous speed.

In one embodiment, the method further includes: determining, by the processing unit, a calibrated static value based on the lookahead power requirement calculation, wherein the plurality of offsets are calculated based on the calibrated static value. In one embodiment, the method further includes: calculating, by the processing unit, a target speed difference ($\Delta V$) between a first speed of the vehicle at a start of the event and a second speed of the vehicle at an end of the event, such that the plurality of offsets are calculated based on the target speed difference. In one embodiment, the event is an incline along the route, and the target vehicle speed curve includes a pre-incline acceleration for a predetermined distance prior to a start of the event to increase the target vehicle speed above the isochronous speed. In another embodiment, the event is a decline along the route, and the target vehicle speed curve includes a pre-decline deceleration for a predetermined distance prior to a start of the event to decrease the target vehicle speed below the isochronous speed.

Various embodiments of the present disclosure relate to vehicle systems that include a mapping application, an engine with a fueling system and an engine speed sensor coupled thereto, a throttle position sensor, and an engine control module operatively coupled with the mapping application, the fueling system, the engine speed sensor, and the throttle position sensor. The engine control module is configured to: receive, from the engine speed sensor and the throttle position sensor, current status information regarding the vehicle; receive, from the mapping application, lookahead information regarding a route to be taken by the vehicle; perform a lookahead power requirement calculation based on the current status information and the lookahead information to determine an event; calculate a plurality of offsets with respect to an isochronous speed of the vehicle based on the determined event; and set a target vehicle speed curve by applying the plurality of offsets to the isochroous speed, wherein operation of the fueling system is limited by the target vehicle speed curve. In some examples, the event is an incline along the route. In some examples, the event is a decline along the route.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein:

FIG. 3 is a graph showing a target vehicle speed curve during a decline when a predictive road speed governor according to an embodiment disclosed herein is activated;

Figure 1A:
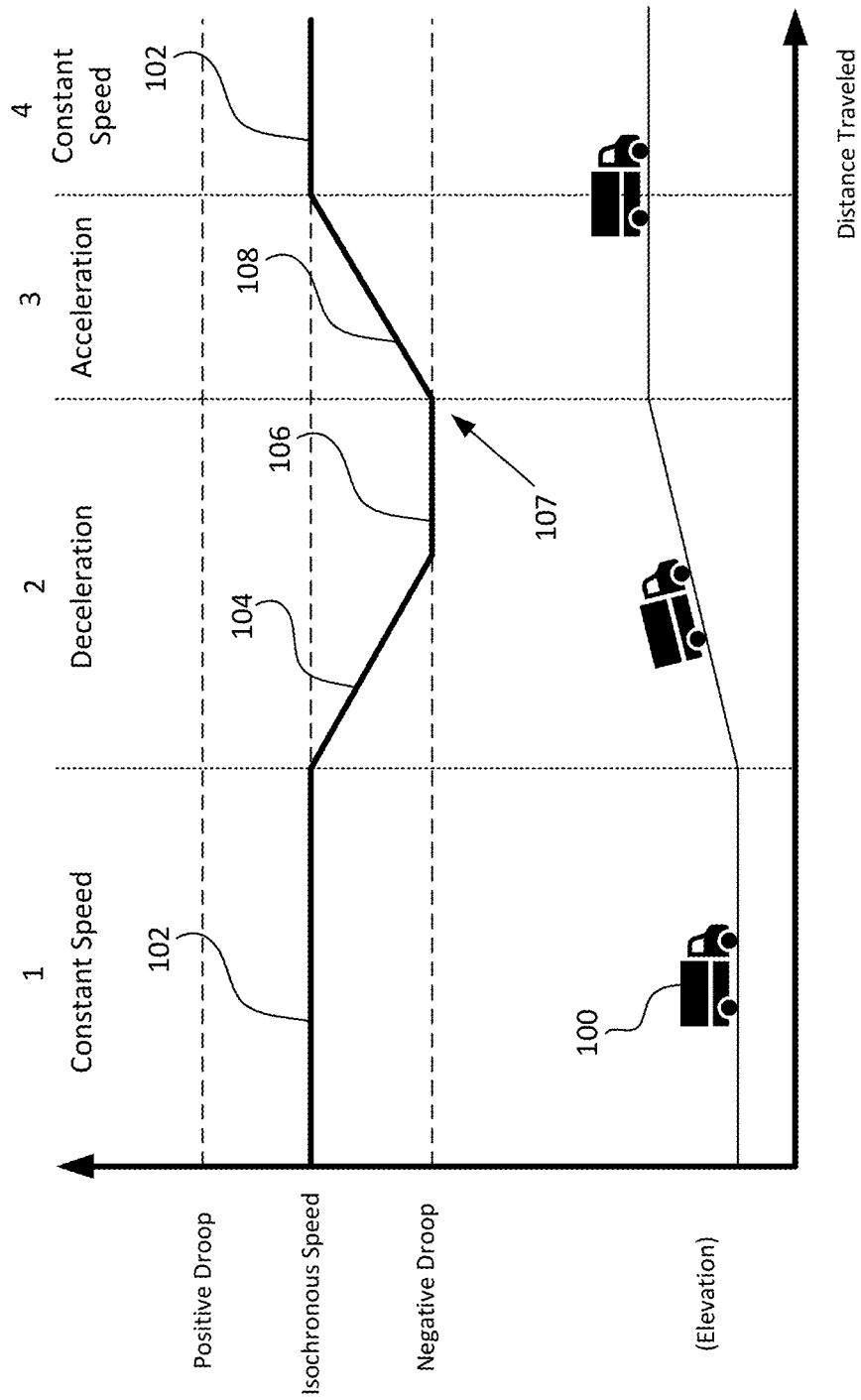
FIG. 1A is a graph of distance versus vehicle speed during an incline when a road speed governor as known in the art is activated.
Figure 1B:
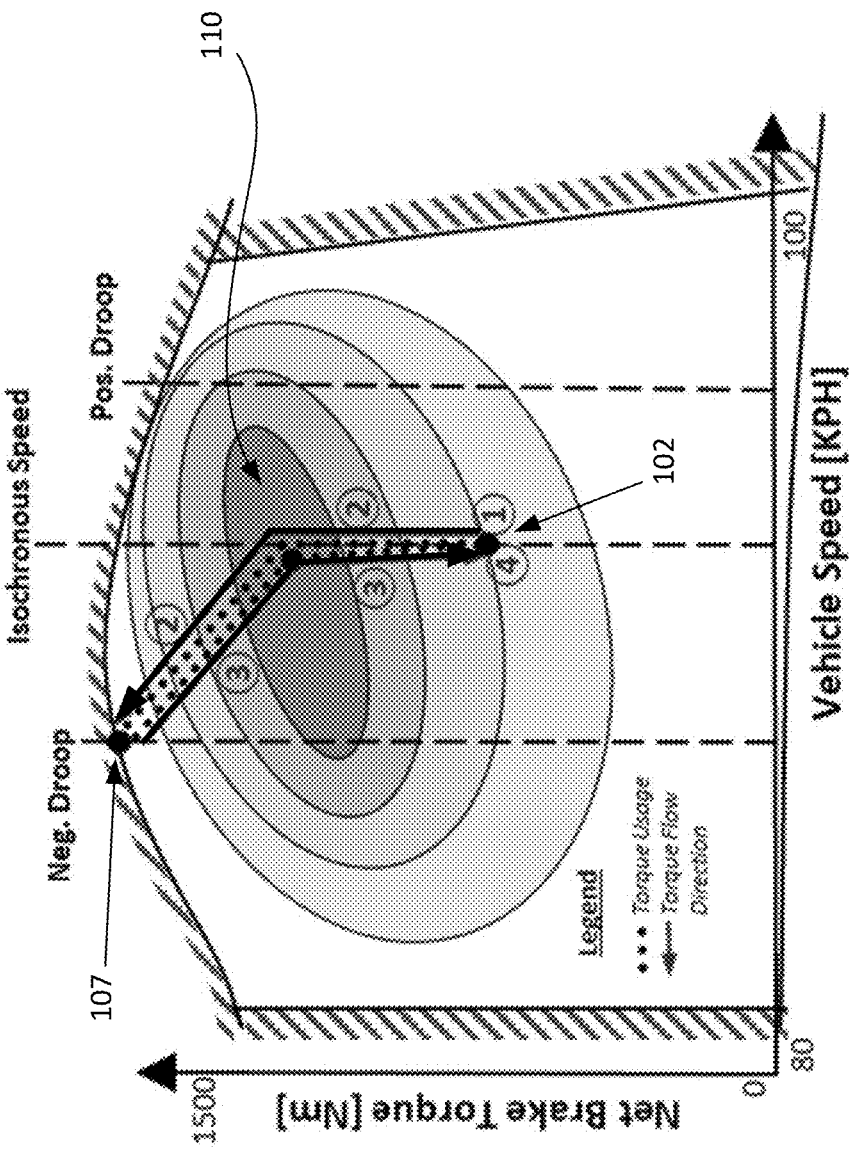
FIG. 1B is a torque usage plot showing different brake thermal efficiency ("BTE") areas based on the vehicle speeds according to FIG. 1A.

Corresponding reference characters indicate corresponding parts throughout the several views. The exemplifications set out herein illustrate exemplary embodiments of the disclosure and such exemplifications are not to be construed as limiting the scope of the disclosure in any manner. While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DISCLOSURE

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments. Furthermore, the described features, structures, or characteristics of the subject matter described herein may be combined in any suitable manner in one or more embodiments.

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings.

The terms "couples," "coupled," and variations thereof are used to include both arrangements wherein two or more components are in direct physical contact and arrangements wherein the two or more components are not in direct contact with each other (e.g., the components are "coupled" via at least a third component), but yet still cooperate or interact with each other. Furthermore, the terms "couples," "coupled," and variations thereof refer to any connection for machine parts known in the art, including, but not limited to, connections with bolts, screws, threads, magnets, electromagnets, adhesives, friction grips, welds, snaps, clips, etc.

Throughout the present disclosure and in the claims, numeric terminology, such as first and second, is used in reference to various components or features. Such use is not intended to denote an ordering of the components or features. Rather, numeric terminology is used to assist the reader in identifying the component or features being referenced and should not be narrowly interpreted as providing a specific order of components or features.

Figure 2A:
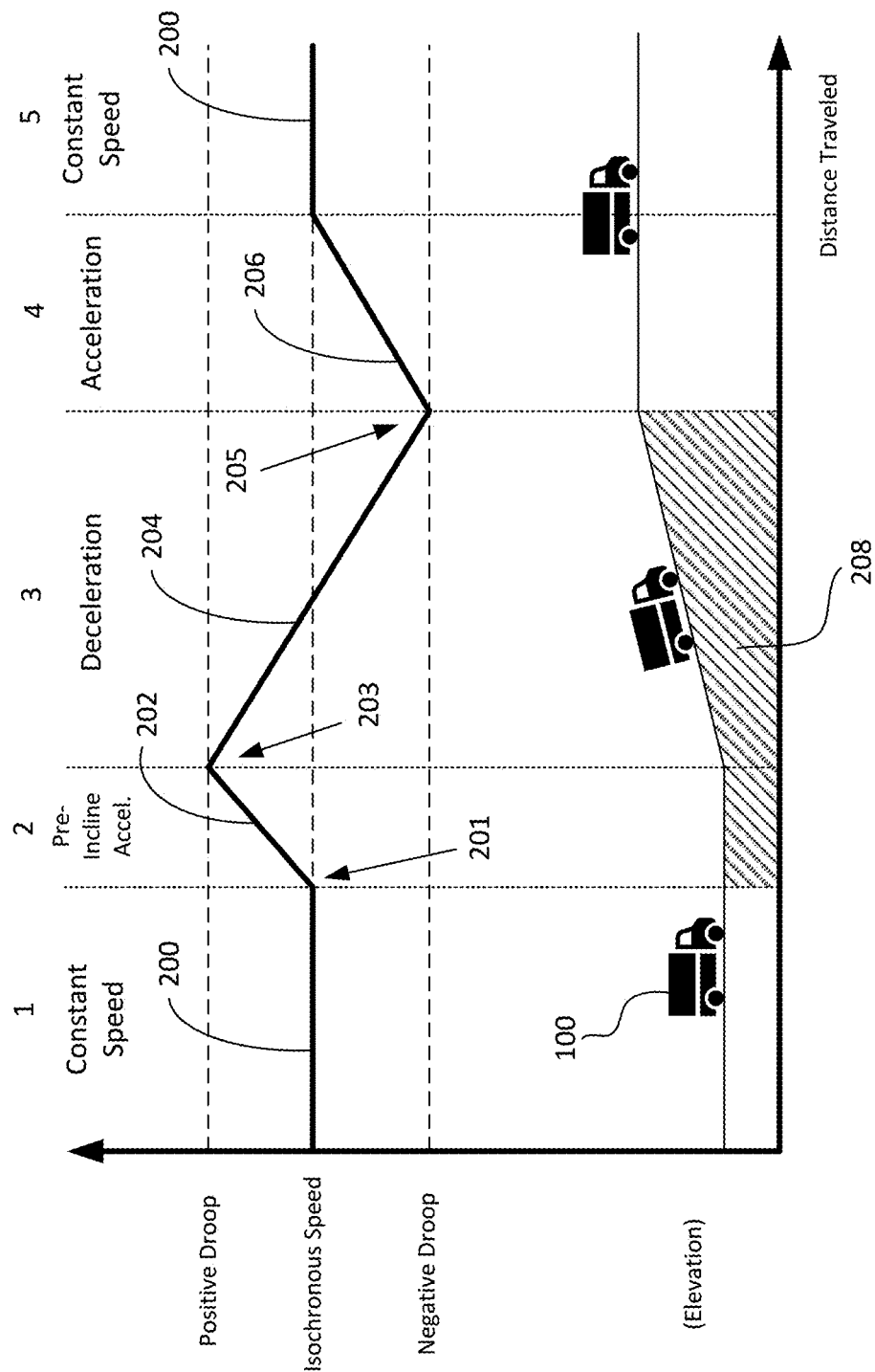
FIG. 2A is a graph showing a target vehicle speed curve, during an incline when a predictive road speed governor according to an embodiment disclosed herein is activated.
Figure 4:
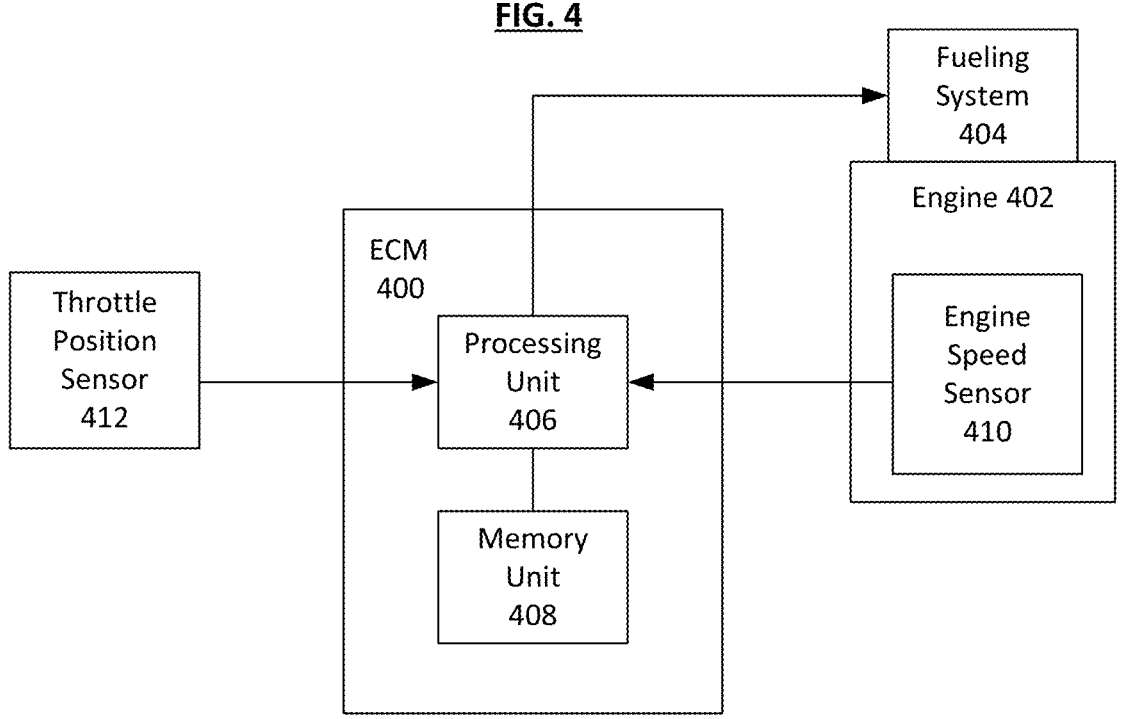
FIG. 4 is a schematic diagram of a vehicle system according to an embodiment.

FIG. 2A shows a target vehicle speed curve of a vehicle 100 during an incline or uphill slope when utilizing the predictive road speed governor ("PRSG") algorithm according to an embodiment. The "target vehicle speed curve" defines the different speeds above which the vehicle 100 is not allowed to increase the fuel intake in the fueling system 404 during the travel such that the vehicle speed remains at or below the target vehicle speed curve at any point during the travel. Reference is made to an engine control module ("ECM") 400 that implements the PRSG algorithm in FIG. 4 according to an embodiment. During the first zone "1" in FIG. 2A, the vehicle 100 travels at the isochronous speed (200) as determined by the processing unit 406 performing the PRSG algorithm, which a portion of the software used by the ECM 400 of the vehicle 100. The vehicle 100 also includes an engine 402, a fueling system 404, and a plurality of sensors such as an engine speed sensor 410 and a throttle position sensor 412, all of which are functionally coupled with the ECM 400 as shown in FIG. 4. The engine 402 in some examples is an internal combustion engine (ICE) with variable throttle states to flexibly control the air and fuel intake of the engine.

The PRSG algorithm is part of the software within the ECM 400 that is run by a processing unit 406. The PRSG algorithm and the rest of the software for the ECM 400 is stored in a memory unit 408 of the ECM 400, and the processing unit 406 performs the PRSG algorithm, including the determinations and calculations, as further explained herein, as well as to control functions of the other components within the vehicle 100. The processing unit 406 may be a central processing unit (CPU), system-on-a-chip (SoC), or any other suitable processor. The memory unit 408 may be any suitable memory, including but not limited to DRAM, SRAM, ROM, flash memory, etc.

In the first zone "1", constant isochronous speed 200 is maintained because the engine speed sensor 410 and the throttle position sensor 412 provide the processing unit 406 of the ECM 400 with data regarding how much of the throttle is activated and how fast the vehicle 100 is currently traveling. In response, the processing unit 406 may send a fuel control signal to the fueling system 404 of the engine 402. For example, when the engine speed sensor 410 indicates the vehicle speed to be lower than the isochronous speed and the throttle is indicated to be wide open according to the throttle position sensor 412, the processing unit 406, which is also a controller, sends the fuel control signal indicating more fuel to be injected into the engine 402, thus increasing the vehicle speed until it reaches the isochronous speed.

Figure 5:
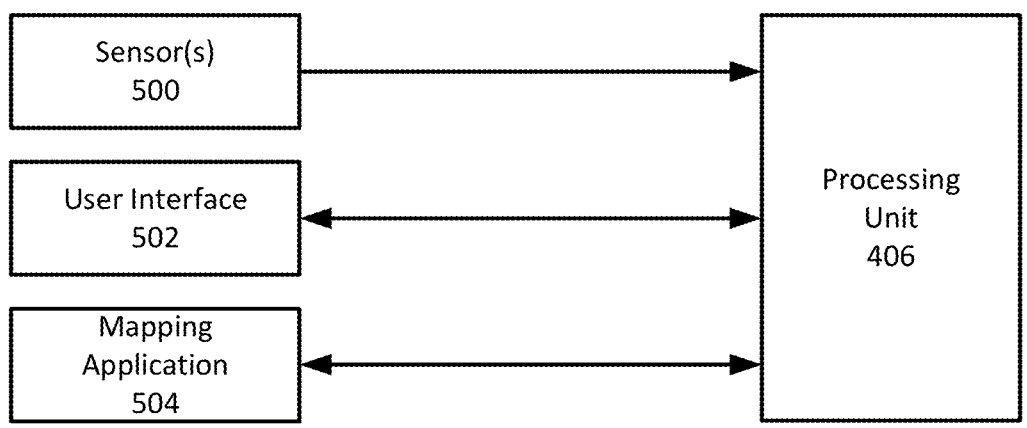
FIG. 5 is a schematic diagram of a predictive vehicle control system according to an embodiment.

In addition to the components shown in FIG. 4, the processing unit 406 may also be operatively coupled with additional sensors 500 as well as a user interface 502 and a mapping application 504 as shown in FIG. 5. In some examples, the additional sensors 500 may include an inclinometer or tilt sensor that indicates the slope of the road traveled by the vehicle 100. The user interface 502 is used by a driver or passenger of the vehicle 100 to provide an intended route to be traveled by the vehicle 100. The mapping application 504 then uses the route information provided via the user interface 502 and provide lookahead information 208 including, but not limited to, upcoming terrain information or road grade information for the roads that the vehicle 100 is expected to travel during the trip. Among the lookahead information 208 provided by the mapping application 504 is the elevation data of the area, such that the processing unit 406 is notified of any upcoming inclines or declines during the trip. In some examples, the mapping application 504 that provides the lookahead information 208 may be implemented in remote systems such as Advanced Driver Assistance Systems (ADASIS) or in a remote server accessible wirelessly by the ECM 400. In some examples, the remote systems may be implemented in a cloud computing network and wireless transmits the lookahead information 208 to the processing unit 406. In some examples, the mapping application 504 may be implemented as part of the software installed on the ECM 400. The lookahead information 208 may be transferred via wires or wirelessly using any suitable telecommunication method.

In response to receiving such lookahead information 208, the processing unit 406 performs a predictive calculation to determine how much the vehicle speed would change in view of the upcoming event. An "event" in this case includes any change in the road grade or power requirement for the vehicle, such as an occurrence of an incline or a decline, as indicated in the lookahead information 208. If the upcoming event is an incline, the lookahead information 208 would include, for example, the distance between the start of the incline and the current location of the vehicle 100, as well as a slope and length of the incline. In some examples, predictive calculation may determine that the slope of the incline may be steep enough such that, before the vehicle 100 reaches the end of the incline, the vehicle speed would decelerate to the negative droop speed, at which point the vehicle 100 would require additional torque to maintain the vehicle speed at the negative droop speed until the vehicle 100 reaches the end of the incline. If so, the processing unit 406 calculates the distance from the incline at which point the vehicle 100 must start accelerating in order to reach a speed that would enable the vehicle 100 to utilize the highest brake thermal efficiency ("BTE") area 110 when driving uphill. In some examples, the increase in acceleration allows the vehicle 100 to utilize the highest BTE area 110 without requiring the vehicle 100 to increase its net brake torque when driving uphill.

In FIG. 2A, the engine 402 is maintained at wide open throttle (WOT), or 100% throttle. The processing unit 406 determines that the vehicle 100 must start accelerating at a point 201 such that by the start of the incline, the vehicle 100 reaches a determined starting speed 203. A pre-incline acceleration 202 follows to reach the speed 203 before deceleration 204 starts in zone "3". The processing unit 406 also determines the predicted decrease in speed (ΔV, a.k.a. "target speed difference", which in this case is negative) experienced by the vehicle 100 during the "uphill" deceleration 204, which enables the processing unit 406 to determine an end speed 205, or the vehicle speed at the end of the incline in zone "3". The ΔV value, therefore, is defined as the difference between speeds 203 and 205, or more specifically, calculated as the end speed 205 at the end of the event minus the starting speed 203 at the start of the event. At the end of the incline, during zone "4", the vehicle 100 begins a post-incline acceleration 206 to reach the isochronous speed 200, after which the vehicle speed is maintained at the constant isochronous speed during zone "5".

Figure 2B:
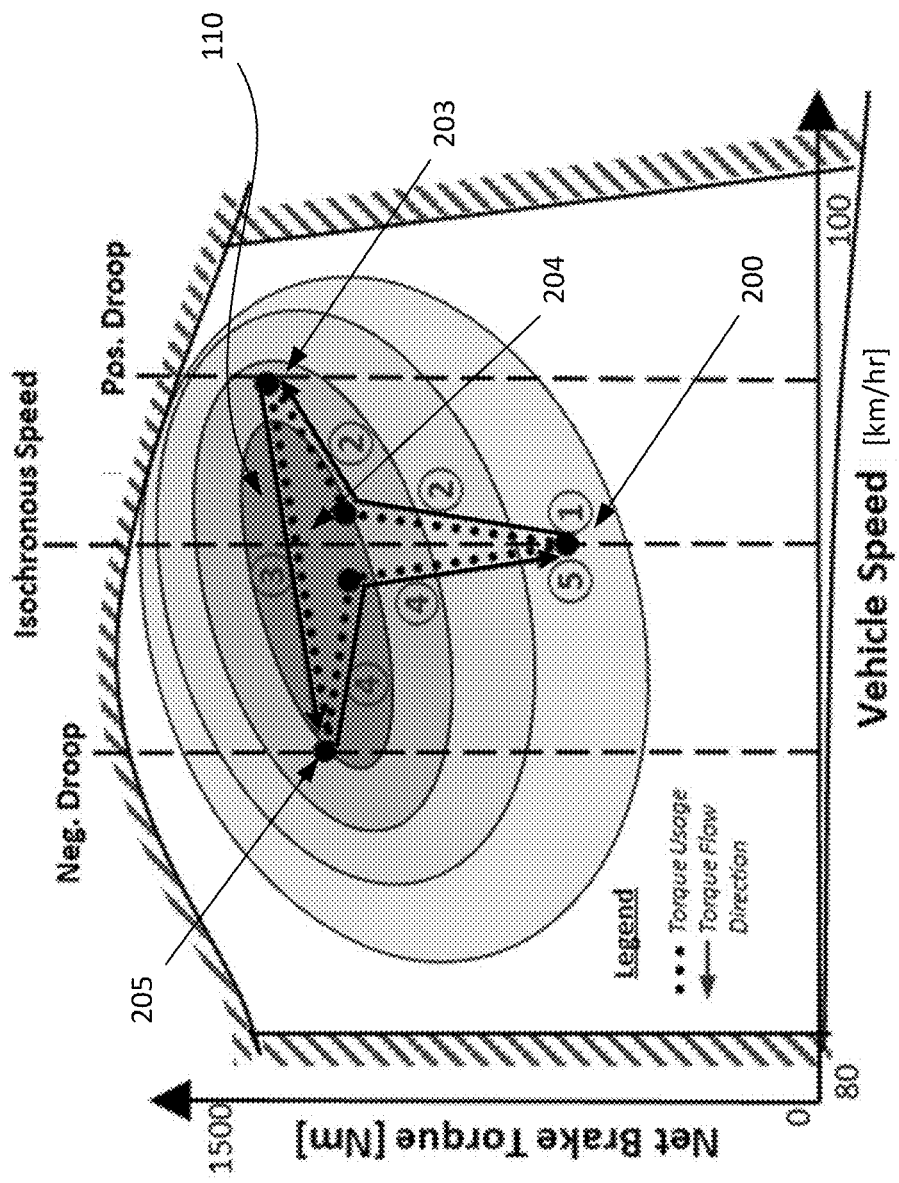
FIG. 2B is a torque usage plot showing different BTE areas based on the vehicle speeds according to FIG. 2A.

FIG. 2B shows the BTE areas used by the engine 402 of the vehicle 100 during the trip shown in FIG. 2A. It is observed that, at the isochronous speed 200 in zones "1" and "5", the engine 402 utilizes a relatively low BTE area, with minimal net brake torque. When the vehicle 100 reaches the starting speed 203, the engine 402 is in a higher BTE area. In some examples, the engine 402 may be in the highest BTE area 110 or relatively closer thereto compared to the isochronous speed 200. During the deceleration 204, a portion of the deceleration 204 occurs in the highest BTE area 110. The portion may occupy the majority of the deceleration 204, for example 70%, 80%, 90%, 100%, or any range therebetween. In some examples, the high BTE area 110 is defined as the area where the efficiency is greater than 35%. In some examples, the high BTE area 110 is defined as the area where the efficiency is greater than 40%, 45%, or 50%.

FIG. 3 shows a target vehicle speed curve of a vehicle 100 during a decline or downhill slope when utilizing the PRSG algorithm according to an embodiment. In contrast to the deceleration 204 experienced during an incline event, a decline event causes acceleration 302. As such, when the lookahead information 208 indicates a decline in response to the route information provided via the user interface 502, the processing unit 406 determines the timing, i.e. point 201, at which the vehicle 100 is to begin a pre-decline deceleration 300 to reach a determined starting speed 203 at the start of the decline, the starting speed 203 in this case being slower than the isochronous speed 200. The processing unit 406 also determines the predicted increase in speed (ΔV, which in this case is positive) experienced by the vehicle 100 during a "downhill" acceleration 302, which enables the processing unit 406 to determine the end speed 205, or the vehicle speed at the end of the decline in zone "3". At the end of the decline, during zone "4", the vehicle 100 starts a post-decline deceleration 304 to reach the isochronous speed 200, after which the vehicle speed is maintained at the constant isochronous speed during zone "5".

Figure 6:
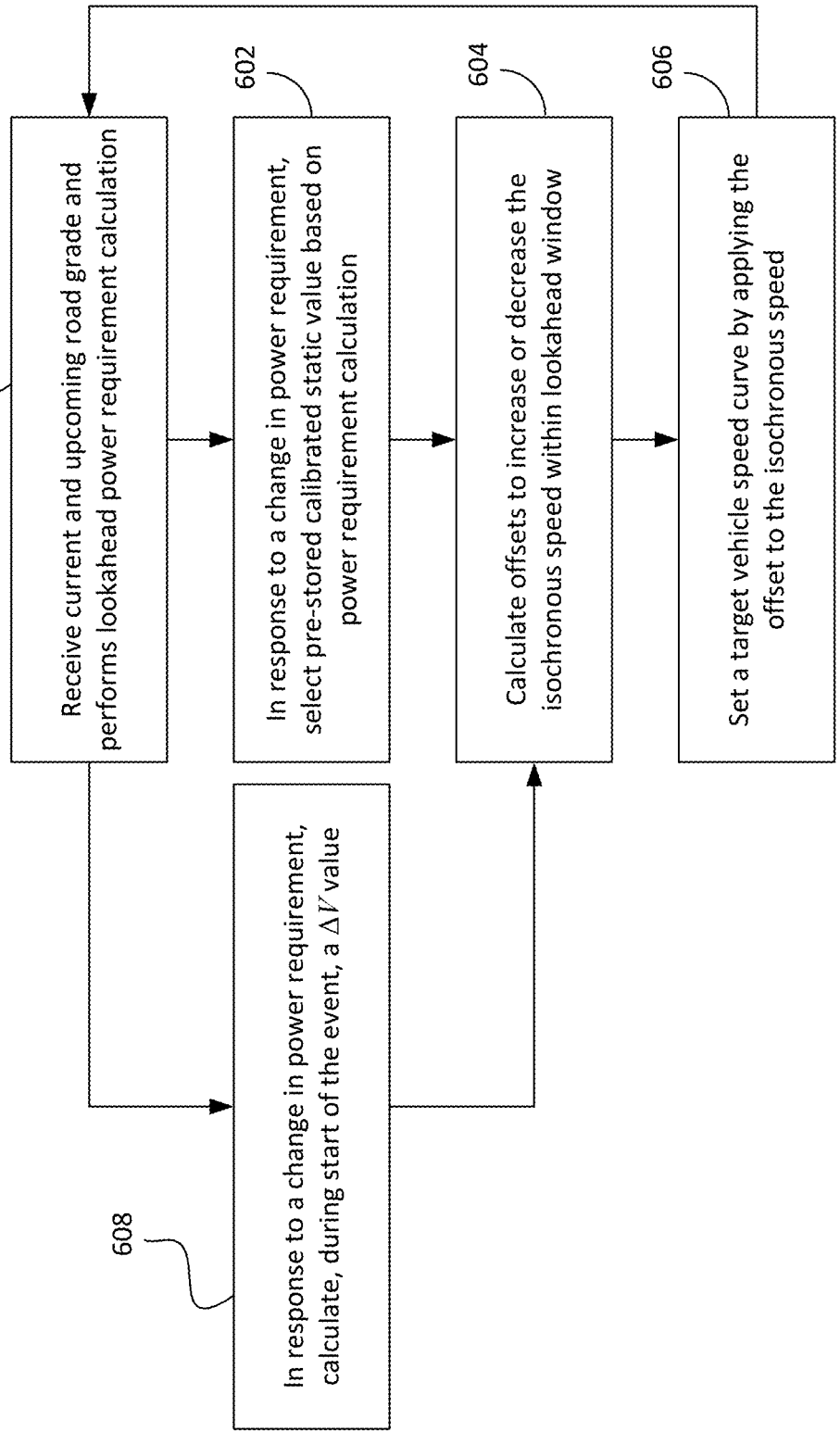
FIG. 6 is a flow diagram of a method of operating the predictive road speed governor as disclosed herein according to an embodiment.

FIG. 6 shows a method as implemented in the PRSG algorithm according to some embodiments, explained in steps. For example, in step 600 of the PRSG algorithm, the processing unit of the ECM receives current status information and upcoming road grade information and performs a lookahead power requirement calculation. In some examples, the current status information includes the current road grade information. In some examples, the current status information includes vehicle sensor data such as the vehicle speed, vehicle acceleration, vehicle load, etc. The lookahead power requirement is defined as the power that is calculated to be required by the vehicle in order to maintain the vehicle at a predetermined speed, fuel efficiency, or other parameters, on the given road grade. The calculation may result in a change in the power requirement, such as an increase in power requirement when there is an upcoming incline or a decrease in power requirement when there is an upcoming decline en route. In response to the change in the lookahead power requirement, in step 602, the processing unit selects a prestored calibrated static value (which includes distance and acceleration) from the memory unit 408 based on how much power is to be required. The prestored calibrated static value may be a set of values, stored in lookup tables for example, that define how much acceleration, positive or negative, is required as well as the distance required to accelerate, or decelerate, in response to an upcoming road grade, based on the current road grade.

In step 604 of the PRSG algorithm, the processing unit calculates offsets to increase or decrease the isochronous speed within a lookahead window. An "offset" is defined as a difference between a predicted target vehicle speed and the isochronous speed at a given time during the predicted event. The lookahead window includes both the window for the pre-incline acceleration (or pre-decline deceleration) and the window for the incline (or decline) itself, as shown by the shaded regions 208 in FIGS. 2A and 3. Therefore, an offset is determined for each change in the target vehicle speed from the isochronous speed such that the offsets collectively determine the target vehicle speed curve, shown as the bold lines in these figures. In step 606, the processing unit sets the target vehicle speed curve by applying the offsets to the isochronous speed.

Alternatively, in some examples, the method uses a different step 608 in the PRSG algorithm in response to the change in power requirement due to an event. In step 608, after step 600, the processing unit calculates, at the start of the event, the ΔV value between the predicted vehicle speed to be reached at the end of the event and the vehicle speed at the start of the event, the ΔV value being positive if the event is an incline and negative if the event is a decline. Subsequently, the method then proceeds to step 604 as explained above.

As explained below, advantages in implementing the PRSG algorithm includes the capability for the engine of the vehicle, for example the ICE, to utilize more of the highest BTE area (e.g., at greater than 35%, 40%, 45%, or 50% efficiency according to some embodiments) during the trip when there is a change in the road grade. Because a high BTE results in more of the heat from the fuel supplied to the engine being converted to mechanical energy to drive the vehicle, higher BTE indicates a more efficient use of the fuel and the engine as a whole, thereby being more preferable than a lower BTE area that translates to greater heat loss. Furthermore, allowing the vehicle to increase its speed above the isochronous speed reduces the trip time, leading to more customer satisfaction.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An engine control module implementable in a vehicle, the engine control module comprising:
a processing unit operative to control a target vehicle speed, the processing unit configured to:
receive current status information and lookahead information regarding a route to be taken by the vehicle;
perform a lookahead power requirement calculation based on the current status information and the lookahead information to determine an event;
calculate a plurality of offsets with respect to an isochronous speed of the vehicle based on the determined event, the offsets including a change in vehicle speed and a distance prior to a start of the event at which the change in vehicle speed is implemented, at least one of which is determined based on brake thermal efficiency of the vehicle such that the brake thermal efficiency remains at or above a threshold efficiency during the change in vehicle speed and the event; and
set a target vehicle speed curve by applying the plurality of offsets to the isochronous speed.

2. The engine control module of claim 1, wherein the processing unit is further configured to determine a calibrated static value based on the lookahead power requirement calculation, wherein the plurality of offsets are calculated based on the calibrated static value.

3. The engine control module of claim 1, wherein the processing unit is further configured to calculate a target speed difference ($\Delta V$) between a first speed of the vehicle at a start of the event and a second speed of the vehicle at an end of the event, wherein the plurality of offsets are calculated based on the target speed difference.

4. The engine control module of claim 1, wherein the event is an incline along the route.

5. The engine control module of claim 4, wherein the target vehicle speed curve includes a pre-incline acceleration for a predetermined distance prior to a start of the event to increase the target vehicle speed above the isochronous speed.

6. The engine control module of claim 5, wherein the target vehicle speed curve includes a deceleration during the event to decrease the vehicle speed below the isochronous speed and a post-incline acceleration after an end of the event to increase the target vehicle speed toward the isochronous speed.

7. The engine control module of claim 1, wherein the event is a decline along the route.

8. The engine control module of claim 7, wherein the target vehicle speed curve includes a pre-decline deceleration for a predetermined distance prior to a start of the event to decrease the target vehicle speed below the isochronous speed.

9. The engine control module of claim 8, wherein the target vehicle speed curve includes an acceleration during the event to increase the target vehicle speed above the isochronous speed and a post-decline deceleration after an end of the event to decrease the target vehicle speed toward the isochronous speed.

10. The engine control module of claim 1, wherein the current status information includes current road grade information.

11. The engine control module of claim 1, wherein the lookahead information includes upcoming road grade information.

12. The engine control module of claim 1, wherein the vehicle speed is to remain at or below the target vehicle speed curve at any point during the route.

13. The engine control module of claim 1, wherein the threshold efficiency is 35%.

14. A method of controlling a target vehicle speed of a vehicle, the vehicle comprising an engine control module including a processing unit, the method comprising:
receiving, by the processing unit, current status information and lookahead information regarding a route to be taken by the vehicle;
performing, by the processing unit, a lookahead power requirement calculation based on the current status information and the lookahead information to determine an event;
calculating, by the processing unit, a plurality of offsets with respect to an isochronous speed of the vehicle based on the determined event, the offsets including a change in vehicle speed and a distance prior to a start of the event at which the change in vehicle speed is implemented, at least one of which is determined based on brake thermal efficiency of the vehicle such that the brake thermal efficiency remains at or above a threshold efficiency during the change in vehicle speed and the event; and setting, by the processing unit, a target vehicle speed curve by applying the plurality of offsets to the isochroous speed.

15. The method of claim 14, further comprising: determining, by the processing unit, a calibrated static value based on the lookahead power requirement calculation, wherein the plurality of offsets are calculated based on the calibrated static value.

16. The method of claim 14, further comprising: calculating, by the processing unit, a target speed difference ($\Delta V$) between a first speed of the vehicle at a start of the event and a second speed of the vehicle at an end of the event, wherein the plurality of offsets are calculated based on the target speed difference.

17. The method of claim 14, wherein the event is an incline along the route, and the target vehicle speed curve includes a pre-incline acceleration for a predetermined distance prior to a start of the event to increase the target vehicle speed above the isochronous speed.

18. The method of claim 14, wherein the event is a decline along the route, and the target vehicle speed curve includes a pre-decline deceleration for a predetermined distance prior to a start of the event to decrease the target vehicle speed below the isochronous speed.

19. The method of claim 14, wherein the threshold efficiency is 35%.

20. A vehicle system comprising:
a mapping application;
an engine with a fueling system and an engine speed sensor coupled thereto;
a throttle position sensor; and
an engine control module operatively coupled with the mapping application, the fueling system, the engine speed sensor, and the throttle position sensor, the engine control module configured to:
receive, from the engine speed sensor and the throttle position sensor, current status information regarding the vehicle;
receive, from the mapping application, lookahead information regarding a route to be taken by the vehicle;
perform a lookahead power requirement calculation based on the current status information and the lookahead information to determine an event;
calculate a plurality of offsets with respect to an isochronous speed of the vehicle based on the determined event, the offsets including a change in vehicle speed and a distance prior to a start of the event at which the change in vehicle speed is implemented, at least one of which is determined based on brake thermal efficiency of the vehicle such that the brake thermal efficiency remains at or above a threshold efficiency during the change in vehicle speed and the event; and
set a target vehicle speed curve by applying the plurality of offsets to the isochroous speed, wherein operation of the fueling system is limited by the target vehicle speed curve.

21. The vehicle system of claim 20, wherein the event is an incline along the route.

22. The vehicle system of claim 20, wherein the event is a decline along the route.

23. The vehicle system of claim 20, wherein the threshold efficiency is 35%.

* * * * *